United States Patent

Jensen

[15] 3,684,969

[45] Aug. 15, 1972

[54] DEMODULATOR FOR FREQUENCY SHIFT MODULATED SIGNALS

[72] Inventor: Leif Egon Jensen, Hvidovrevej 76 C DK-2610, Rodovre, Denmark

[22] Filed: June 22, 1971

[21] Appl. No.: 155,462

[30] Foreign Application Priority Data

June 23, 1970 Sweden ....................8635/70

[52] U.S. Cl. ..................329/104, 325/320, 329/122

[51] Int. Cl. ...............................................H04l 27/14

[58] Field of Search ..329/104, 122; 325/320; 178/66

[56] References Cited

UNITED STATES PATENTS

| | | | |
|---|---|---|---|
| 3,510,779 | 5/1970 | Klapper | 325/320 |
| 3,555,428 | 1/1971 | Perreault | 325/320 |
| 3,559,083 | 1/1971 | Crouse | 329/104 |
| 3,571,712 | 3/1971 | Hellwarth | 329/104 UX |

*Primary Examiner*—Alfred L. Brody
*Attorney*—C. Cornell Remsen, Jr. et al.

[57] ABSTRACT

If square wave generation in response to a frequency shift base band signal is to be correct, the value of the threshold or trigger control voltage has to bear a definite relationship at each moment to the zero crossings of the alternating voltage component of the baseband signal. This is achieved by two resistors connected in series between a frequency demodulator and the output of a square wave generator, with the junction of the resistors being connected to a first non-phase inverting input of the generator, a third resistor connected between the demodulator and a second phase-inverting input of the generator, a fourth resistor connected between a reference potential and the second input, and an integrating capacitor connected between the reference potential and the junction of the first and second resistors.

3 Claims, 6 Drawing Figures

INVENTOR
L. E. JENSEN
BY
Alfred C. Hill
AGENT

INVENTOR
L. E. JENSEN
BY
Alfred C. Hill
AGENT

DEMODULATOR FOR FREQUENCY SHIFT MODULATED SIGNALS

BACKGROUND OF THE INVENTION

This invention refers to a circuit arrangement for correcting asymmetrical distortion, originating in frequency faults, in a demodulator for frequency shift modulated signals, wherein a base band signal is supplied from a frequency demodulator and a conversion circuit is adapted for converting the trapezoidal base band signal to a square wave signal.

A demodulator should automatically be able to carry out correction of distortion originating in a frequency fault, which, for example, may manifest itself as a displacement of the frequency spectrum of the channel. The correction is to be effective even if a predistortion and/or a frequency shift deviation from the nominal value occurs simultaneously with the frequency displacement.

In known equipment the mentioned correction is carried out by means of a control voltage which on the basis of the direct current signal (base band signal) supplied by the discriminator determines the threshold or trigger value of the conversion circuit or square wave generator that converts the base band signal to a square wave signal. The required condition for the conversion to always be correct is that the value of the threshold or trigger control voltage at each moment bears a definite relationship to the zero crossings of the alternating voltage component of the base band signal, since these zero crossings represent the optimum sensing points for undistorted conversion of the baseband signal to a square wave signal. None of the correction circuits that are known in the prior art and that have been utilized in practice have entirely fulfilled this condition, which has resulted in the distortion correction not having been satisfactory, particularly with respect to the so-called predistorted signal.

SUMMARY OF THE INVENTION

This invention proposes a new principle for generating a threshold or trigger control voltage for being utilized in frequency demodulators in connection with correcting distortion originating from frequency faults, with said control voltage having such characteristics that converting the baseband signal to square wave signal may be carried out practically independently of any frequency faults that may be present as well as of predistortion in the predistorted signal.

In accordance with this invention, a circuit arrangement of the type mentioned in the introductory paragraph under the heading "Background of the Invention," , wherein the drawbacks of the known arrangements are eliminated.

A feature of the present invention is the provision of first and second resistors connected in series between the demodulator and the output of the square wave generation circuit, the junction of the resistors being connected to a first non-phase inverting input of the generation circuit, a third resistor connected between the demodulator and a second phase inverting input of the generation circuit, a fourth resistor connected between a reference potential and said second input, and a capacitor for integrating purposes connected between the reference potential and the junction of the first and second resistors.

The principle of the novel circuit arrangement is as follows: In utilizing linear sections, a continuous, direct addition of the base band signal voltage and the voltage of a square wave signal generated under control of the base band signal and fed back with respect to the base band signal is carried out in a balancing circuit, so that the zero crossings of the square wave signal correspond to the zero crossings of the baseband signal. With correct balancing conditions the average of the resulting total voltage will then be practically independent of any frequency faults that occur and the predistortion conditions will bear a constant ratio to the zero crossings corresponding to the alternating voltage component of the base band signal, which passages, as has been mentioned previously, represent the optimum sensing points for undistorted conversion of the base band signal to a square wave signal. This average voltage, the integrated total voltage, can therefore, when used as a control voltage for the square wave generator automatically determines the value of the threshold or trigger voltage that operatively is the optimum value at each moment with respect to undistorted conversion.

BRIEF DESCRIPTION OF THE DRAWING

Above-mentioned and other features and objects of this invention will become more apparent by reference to the following description taken in conjunction with the accompanying drawing in which.

Figure 1:
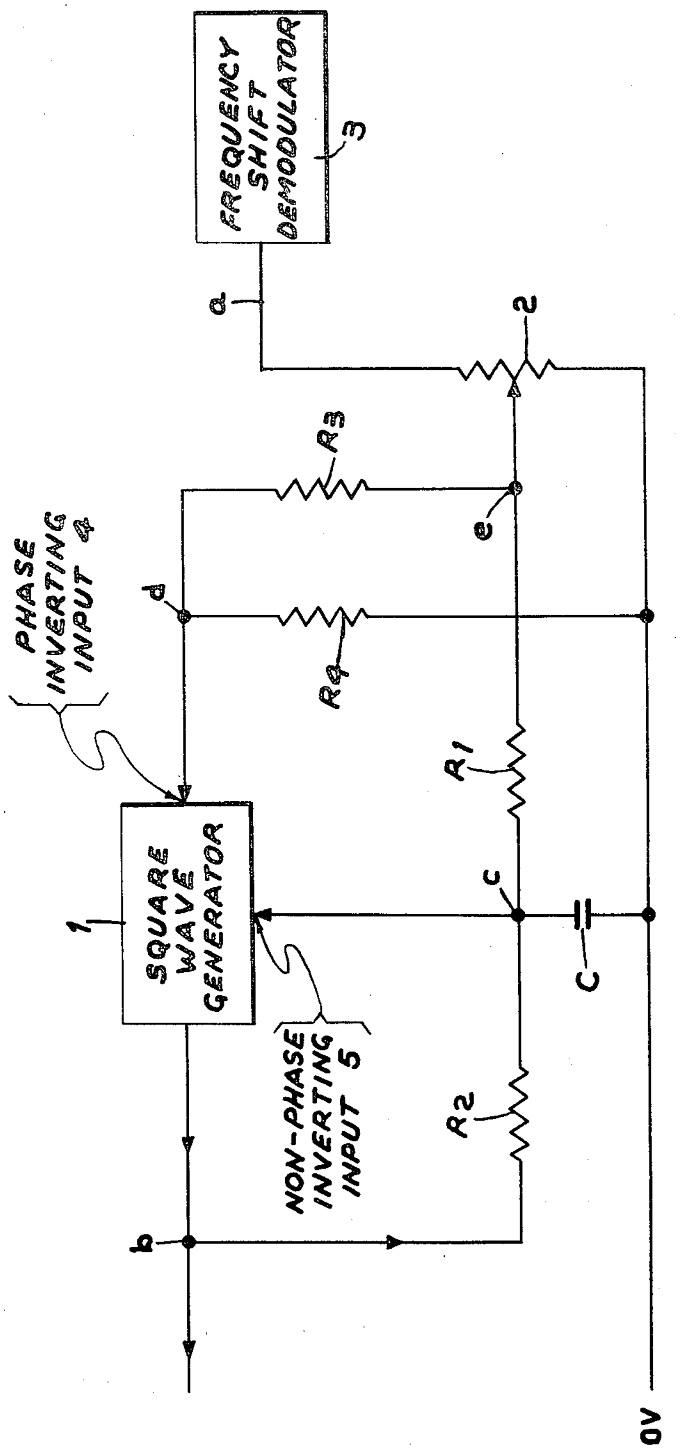
FIG. 1 shows the circuit arrangement in accordance with the invention adapted for being connected to a demodulator for frequency shift modulated signals.

FIGS. *2a–2e*, respectively, show various signal conditions which are illustrative of the function of the circuit arrangement in accordance with the invention as illustrated by FIG. 1.

DESCRIPTION OF THE PREFERRED EMBODIMENT

Referring to FIG. 1, the linear additive sections consist of two resistors R1 and R2, which together with two other resistors R3 and R4 comprise a bridge-connected matching circuit for square wave generator 1 which may be a Schmitt trigger circuit. Resistor R3 is connected between frequency shift demodulator 3 and the phase inverting input 4 of generator 1, and resistor R4 is connected between a reference potential, which preferably may be 0 volts, and input 4. A capacitor C for integrating purposes is connected between the reference potential, 0 volts, and the junction of resistors R1 and R2. Said junction is also connected to generator 1 by means of non-phase inverting input 5. Hence, generator 1 is supplied with both control voltage from point *c* and base band signal voltage from point *d* by means of matching circuits in a predetermined voltage operative dependency condition which is determined by the signal voltage at the output of demodulator 3 and bridge component ratio and, with regard to the control voltage at point *c*, also by the additive process. The bridge component ratio is determined in accordance with the following general rules: The mutual resistance ratio of the two additive resistors R1 and R2 should be proportional to the ratio of the nominal voltage magnitudes of the base band signal at point *e* and the square wave signal at point *b*, respectively, with the nominal magnitude of the control voltage being approximately 0 volts. The ratio of the two other bridge resistors R3 and R4 determines the degree of control, which, therefore, with an appropriate selection of this ratio may be determined optimally in consideration of given circuit functions in general. In practice, correct circuit balance in voltage operative respect is achieved by adjustment of the magnitude of the base band signal voltage. For this purpose a voltage divider or potentiometer 2 has one of its permanent terminals connect to the output of demodulator 3 its other permanent terminal connected to the potential 0 volts (THE reference potential), and its movable terminal connected, on one hand, to resistor R1 and, on the other hand, to resistor R3. With a nominal frequency swing, adjustment is carried out until the control voltage has the same value under different conditions. In connection with frequency shift deviations from nominal magnitude it should be noted that correct circuit balance cannot be retained entirely, which results in a minor distortion increase. It should be added that the correction with regard to the predistorted signal is to some extent dependent on the transient conditions of the base band signal. A low pass filter (not shown) following the demodulator should therefore be dimensioned such, that the transient sequence is well defined and is carried out in such manner that no additional transient phenomena of substantial magnitude occur immediately after the primary transient sequence.

Figures 2A, 2B, 2C, 2D, 2E:
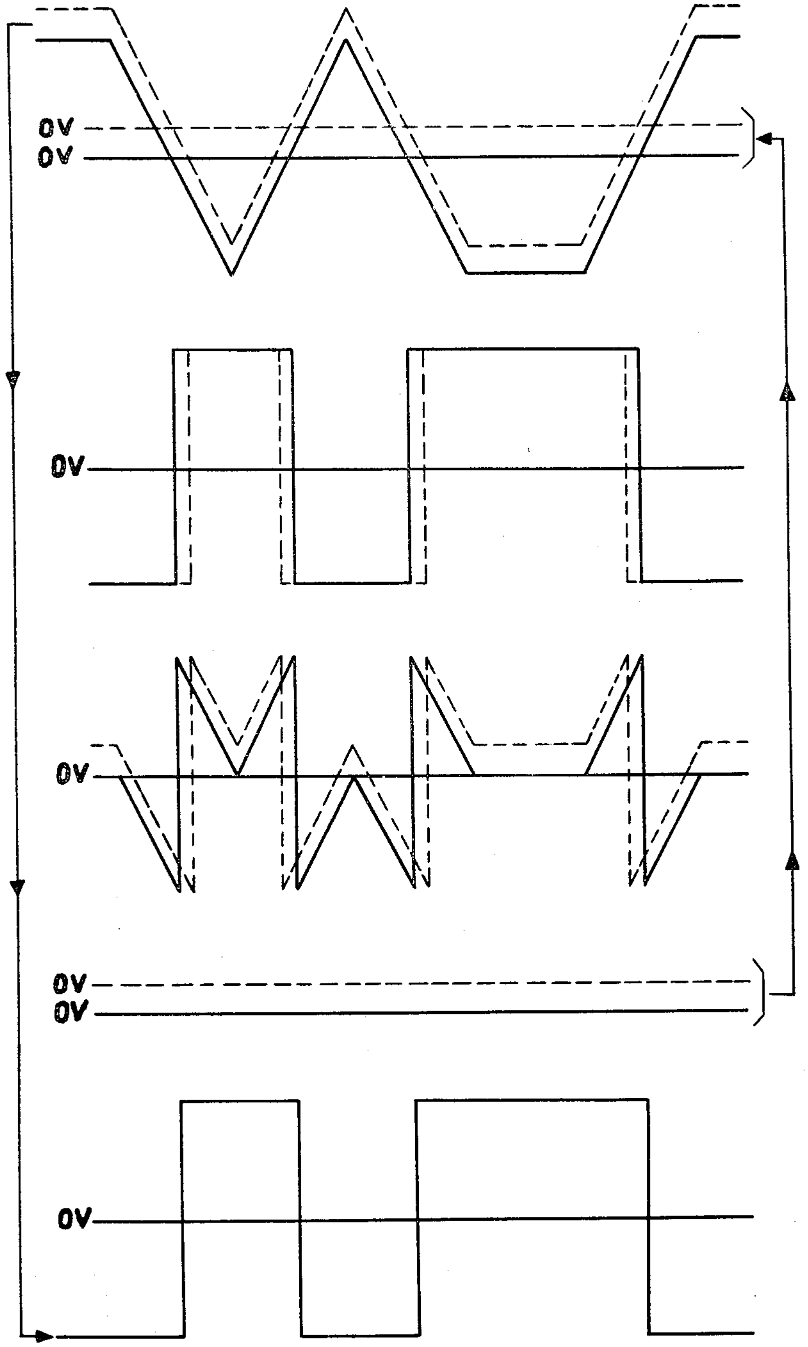

As may be seen from FIG. 1 the mechanical and electrical design of the circuit are simple, and the circuit comprises a small number of simple components. The component values are comparatively uncritical in practice, and, therefore, greater deviations from the nominal component value do not have any substantial influence on the circuit function in themselves, which function, thus, is uncritical also with regard to adjustment and is stable on both a short-term and long-term basis. FIGS. 2*a*–2*e*, respectively, illustrate different signal conditions. The solid lines illustrate conditions without frequency displacement and the dashed lines illustrate conditions with frequency displacement. FIG. 2*a* shows a base band signal having a trapezoidal configuration such as at point *d* of FIG. 1, FIG. 2*b* shows a square wave signal such as at point *b* of FIG. 1, FIG. 2*c*shows the theoretical total addition of the signals illustrated in FIGS. 2*a* and 2*b*, FIG. 2*d* shows the result of integrating the signals of FIGS. 2*a* and 2*b* such as at point *c* of FIG. 1, and FIG. 2*e* the resulting square wave signal achieved in accordance with the circuit arrangement of the present invention after correction.

While I have described above the principles of my invention in connection with specific apparatus it is to be more clearly understood that this description is made only by way of example and not as a limitation to the scope of my invention set forth in the objects thereof and in the accompanying claims.

I claim:

1. A circuit arrangement for correcting asymmetrical distortion, originating infrequency faults, in a demodulator for frequency shift modulated signals comprising:
   - a frequency demodulator for supplying a base band signal;
   - a conversion circuit for converting said base band signal to a square wave signal, said circuit having an output, a first phase inverting input, and a second non-phase inverting input;
   - a first resistor and a second resistor coupled in series with respect to each other, the output of said demodulator and the output of said circuit; the junction of said first and second resistors being coupled to said second input of said circuit;
   - a third resistor coupled between the output of said demodulator and said first input of said circuit;
   - a reference potential;
   - a fourth resistor coupled between said reference potential and said first input of said circuit; and
   - a capacitor for integrating purposes coupled between said reference potential and said junction of said first and second resistors.

2. A circuit arrangement according to claim 1, further including
   - a potentiometer having one of its permanent terminals coupled to the output of said demodulator, the other of its permanent terminals coupled to said reference potential and its movable terminal coupled to one of said first and second resistors and said third resistor.

3. A circuit arrangement according to claim 2, wherein
   - said reference potential is 0 volts.

* * * * *